US007114063B1

(12) United States Patent (10) Patent No.: US 7,114,063 B1
Fontaine et al. (45) Date of Patent: Sep. 26, 2006

(54) CONDITION INDICATOR FOR USE BY A CONDITIONAL BRANCH INSTRUCTION

(75) Inventors: Lawrence Richard Fontaine, Minneapolis, MN (US); John Steven Kuslak, Blaine, MN (US); Gary John Lucas, Pine Springs, MN (US); Michael David Pelarski, Fridley, MN (US)

(73) Assignee: Unisys Corporation, Blue Bell, PA (US)

( * ) Notice: Subject to any disclaimer, the term of this patent is extended or adjusted under 35 U.S.C. 154(b) by 627 days.

(21) Appl. No.: 09/727,744

(22) Filed: Dec. 1, 2000

(51) Int. Cl.
*G06F 9/44* (2006.01)
(52) U.S. Cl. .................................................. 712/235
(58) Field of Classification Search ................ 712/234, 712/237, 239, 233
See application file for complete search history.

(56) References Cited

U.S. PATENT DOCUMENTS

| 3,573,854 | A | * | 4/1971 | Watson et al. ............... 712/237 |
| 3,577,189 | A | * | 5/1971 | Cocke et al. ................ 712/219 |
| 4,788,655 | A | * | 11/1988 | Nakayama et al. .......... 708/496 |
| 4,855,904 | A | | 8/1989 | Daberkow et al. ........... 364/200 |
| 4,875,160 | A | | 10/1989 | Brown, III .................. 364/200 |
| 4,890,225 | A | | 12/1989 | Ellis, Jr. et al. ............. 364/200 |
| 4,924,376 | A | | 5/1990 | Ooi ............................ 364/200 |
| 4,967,351 | A | * | 10/1990 | Zmyslowski et al. ........ 712/234 |
| 5,193,157 | A | * | 3/1993 | Barbour et al. .............. 712/234 |
| 5,317,700 | A | | 5/1994 | Hammitt et al. ............. 395/375 |
| 5,539,888 | A | | 7/1996 | Byers et al. ................. 395/375 |
| 5,666,507 | A | | 9/1997 | Flora ........................... 395/394 |
| 5,826,070 | A | * | 10/1998 | Olson et al. ................. 712/222 |
| 6,065,115 | A | | 5/2000 | Sharangpani et al. ........ 712/235 |
| 6,073,230 | A | | 6/2000 | Pickett et al. ................ 712/205 |
| 6,324,641 | B1 | * | 11/2001 | Matsumoto et al. ......... 712/220 |
| 6,330,657 | B1 | * | 12/2001 | Col et al. ...................... 712/23 |
| 6,338,136 | B1 | * | 1/2002 | Col et al. .................... 712/221 |
| 6,647,489 | B1 | * | 11/2003 | Col et al. .................... 712/226 |

OTHER PUBLICATIONS

Heuring, Vincent P. and Jordan, Harry F. Computer Systems Design and Architecture. Reading, Mass.: Addison Wesley Longman, Inc., ©1997. pp. 92-95.*
Free On-line Computing Dictionary. ©1998. http://www.instantweb.com/foldoc/foldoc.cgi?computer+dictionary Search terms: branch, jump.*

(Continued)

*Primary Examiner*—Eddie Chan
*Assistant Examiner*—Aimee J. Li
(74) *Attorney, Agent, or Firm*—Charles A. Johnson; Mark T. Starr; Crompton, Seager & Tufte, LLC

(57) ABSTRACT

A branch prediction method and system are provided that accurately predict a branch condition early in an instruction pipeline of a data processing system. By accurately predicting the branch condition, the correct target instruction can be fetched early, thereby avoiding many of the inefficiencies associated with branch mispredictions. To accurately predict if a branch condition is satisfied, one or more pre-calculated status bits are stored along with a digital value that is read by the conditional branch instruction to determine if the branch condition is satisfied. By including such a status bit, the condition of the conditional branch instruction may be immediately determined, without waiting for the instruction to be processed by an arithmetic unit or the like in a subsequent pipeline stage.

25 Claims, 9 Drawing Sheets

OTHER PUBLICATIONS

Microsoft Press®. "Computer Dictionary The Comprehensive Standard for Business, School, Library, and Home". Second Edition. Redmond, Washington: Microsoft Press, ©1994. pp. 53, 91-92, and 226.*

Rosenberg, Jerry M. "Dictionary of Computers, Information Processing, & Telecommunications". Second Edition. New York: John Wiley & Sons, ©1987. pp. 63-64, 120-121, and 319.*

Free On-line Dictionary of Computing ©1994-1999. Search Term: register http://www.instantweb.com/foldoc/foldoc.cgi?query=register.*

American Heritage® Dictionary of the English Language, Fourth Edition. ©2000. Search Term: submit http://dictionary.reference.com/search?q=submit.*

* cited by examiner

CONDITION INDICATOR FOR USE BY A CONDITIONAL BRANCH INSTRUCTION

BACKGROUND OF THE INVENTION

1. Technical Field of the Invention

The present invention generally relates to the field of data processing systems, and more particularly to such systems that process instruction streams that include conditional branch instructions.

2. Description of the Prior Art

In most general purpose, stored program, digital computers, software is developed under the assumption that program instructions are executed in their entirety in a sequential fashion. This frees the software developer from the need to account for potential non-sequential operation of the hardware. However, most large-scale, modem machines are designed to take advantage of the overlapping of various functions. In its simplest form, such overlapping permits instruction processing of the $N+1^{st}$ instruction to be performed during operand processing of the $N^{th}$ instruction. U.S. Pat. No. 4,890,225 issued to Ellis, Jr. et al. shows a rudimentary overlapped machine. To free the software developer from concerns about non-sequentiality, Ellis Jr. et al. store the machine state during the complete execution of the $N^{th}$ instruction. U.S. Pat. No. 4,924,376 issued to Ooi provides a technique for resource allocation in an overlapped environment.

A more general form of overlapping is termed a pipelined environment. In implementing such a machine, the designer dedicates certain hardware resources to the various repetitive tasks. Overall system performance is improved by breaking the pipeline into these many dedicated hardware elements, or stages. The performance advantage in this dedication comes from employing these dedicated hardware elements simultaneously. Typically, this means that instruction, decode, operand fetch, and arithmetic operations each have separate and dedicated hardware resources. Even though the $N^{th}$ instruction is processed by each of these hardware resources sequentially, each separate hardware resource is deployed on a different instruction simultaneously. The $N+1^{st}$ instruction may be preprocessed by the instruction fetch and decode hardware, while the $N^{th}$ instruction is being processed by the operand fetch hardware and while the $N-1^{st}$ instruction is being processed by the arithmetic hardware. U.S. Pat. No. 4,855,904 issued to Daberkow et al. describes a pipelined architecture.

Pipelined architectures work most efficiently when each stage of the pipeline is filled with a program instruction so that the pipeline generates useful output during every clock cycle. However, program instructions do not always proceed in a linear sequence. A program may contain various changes, or branches, that alter the program flow. For instance, "if A=B, then branch to instruction C" is an example of a conditional branch instruction that alters the stream of the program to instruction C if A=B. However, if the conditional branch instruction is fetched before the condition of "A=B" is determined, the processor can not determine which branch to take. Without any alternate methods to predict or pre-calculate the resolution of the condition, the processor must stall the pipeline until the condition is determined. Stalling is undesirable because it wastes processor resources and thus adversely affects processor efficiency.

Various processors use branch prediction logic to help overcome the problem of stalling the pipeline. With branch prediction, the processor will guess which way the branch condition will be resolved. Often this guess is based on previous history. If the branch prediction logic predicts that a condition will be met, then the processor will process a certain set of target instructions. If the branch prediction logic predicts that a condition will not be met, then the processor will process sequential instructions, the instructions following the branch condition. If the branch prediction logic correctly predicts the branch condition, the processor will not stall. If, however, the prediction is incorrect, the instructions in the pipeline must be flushed and the correct instructions fetched. The processor may require several clock cycles to flush the pipeline and fetch the correct instructions. Therefore, a misprediction can reduce the efficiency of the processor.

SUMMARY OF THE INVENTION

The present invention overcomes many of the disadvantages of the prior art by providing a branch prediction method and system that can accurately predict a branch condition early in the instruction pipeline, and preferably before the instruction reaches the arithmetic stage of the instruction processor. Thus, when the present branch prediction method is applied, the correct target instruction can be fetched early, thereby avoiding many of the inefficiencies associated with branch miss predictions.

In a preferred embodiment, the present invention is used in conjunction with a pipelined instruction processor that executes instructions including conditional jump instructions. As is known, conditional jump instructions typically read a digital value from memory to determine if the condition of the conditional jump instruction is satisfied. To accurately determine if the conditions are satisfied, the memory preferably stores one or more pre-calculated status bits along with the digital value that is read by the conditional jump instruction to determine if the condition is satisfied. Each status bit corresponds to a particular type of jump instruction, and indicates whether the particular jump condition is satisfied. For example, one status bit may correspond to a jump zero condition that jumps to a target address if the digital value read from the memory equals zero. In this case, the status bit may indicate if the corresponding digital value is equal to zero.

By including such a status bit, the condition of the conditional jump instruction may be immediately determined, without waiting for the instruction to be processed by the arithmetic unit or the like in a subsequent pipeline stage. Other illustrative conditional jump instructions include, for example, jump positive, jump negative, and jump low bit instructions.

In one illustrative embodiment, the conditional jump instruction reads the digital value from an addressed "A" register, which is part of a General Register Set (GRS). The particular "A" register is identified by an "A" address, which is provided by the instruction. To avoid misprediction, the present invention preferably checks to see whether any of the preceding instructions in the instruction pipeline also reference the addressed "A" register. If the addressed "A" register could be changed by a proceeding instruction in the instruction pipeline, the jump prediction may not be accurate and therefore may be disabled. If, however, none of the preceding instructions in the instruction pipeline reference the addressed "A" register, the status bits stored in the addressed "A" register are used to determine the condition of the current conditional jump instruction. By accurately predicting the jump condition early in the instruction pipeline, the proper instructions may be fetched and executed, which may significantly improve system performance.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
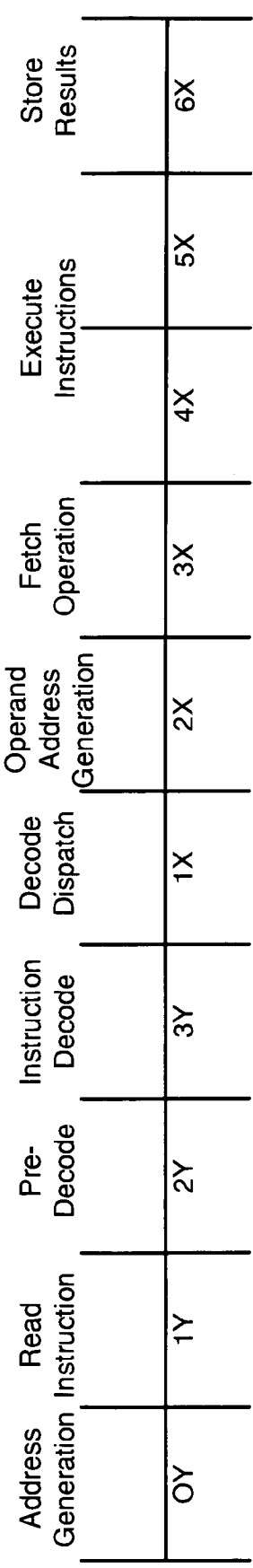
FIG. 1 is a timing diagram showing pipelined execution of an instruction by an exemplary Instruction Processor (IP)

FIG. 1 is a timing diagram showing pipelined execution of an instruction by an exemplary Instruction Processor (IP). Pipelined instruction execution is a method of increasing system throughput by dividing the execution of each instruction into functional operations that can be performed within different areas of the IP. Since each functional area of the IP can be processing somewhat independently from the other functional areas, the IP can be executing portions of several instructions at one time so that instruction execution is overlapped.

The timing diagram of FIG. 1 shows a standard instruction being divided into ten functional operations. Each of these functional operations may be referred to as stage of execution. During the first stage, designated as the "0Y" stage, address generation occurs for the instruction. Next, the instruction is retrieved from cache memory during the "1Y" stage. Following instruction retrieval, pre-decode of the instruction begins during the pre-decode stage shown as "2Y". During stage "1Y" and "2Y", the instruction is staged in an instruction queue. Instruction decode begins in the "3Y" stage. During the "1X" stage, the decoded instruction signals are dispatched to the various logic sections of the IP that perform instruction execution. Stage "2X" is utilized primarily to generate any operand address that is required for instruction execution. During the "3X" stage, the operand address is used to fetch the operand from cache memory. Stages "4X" and "5X", respectively, are generally devoted to executing the operations specified by the decoded instruction, and the "6X" stage is used to store any results from the instruction execution.

In the pipeline architecture represented by the timeline of FIG. 1, stages 0Y, 1Y, 2Y, and 3Y are considered "instruction fetch" stages, and the actual instruction execution stages are the 1X through 6X stages. Since in this example, six standard instructions may be in instruction execution stages simultaneously during the 1X through the 6X stages, the illustrated pipeline architecture is said to represent a six-deep instruction pipeline. That is, while a first instruction undergoes decode dispatch during the 1X stage, operand address generation occurs for a second instruction during stage 2X. At the same time, operands for a third instruction are being retrieved, execution is occurring for fourth and fifth instructions, and any results produced by instruction execution are being stored for a sixth instruction.

Figure 2:
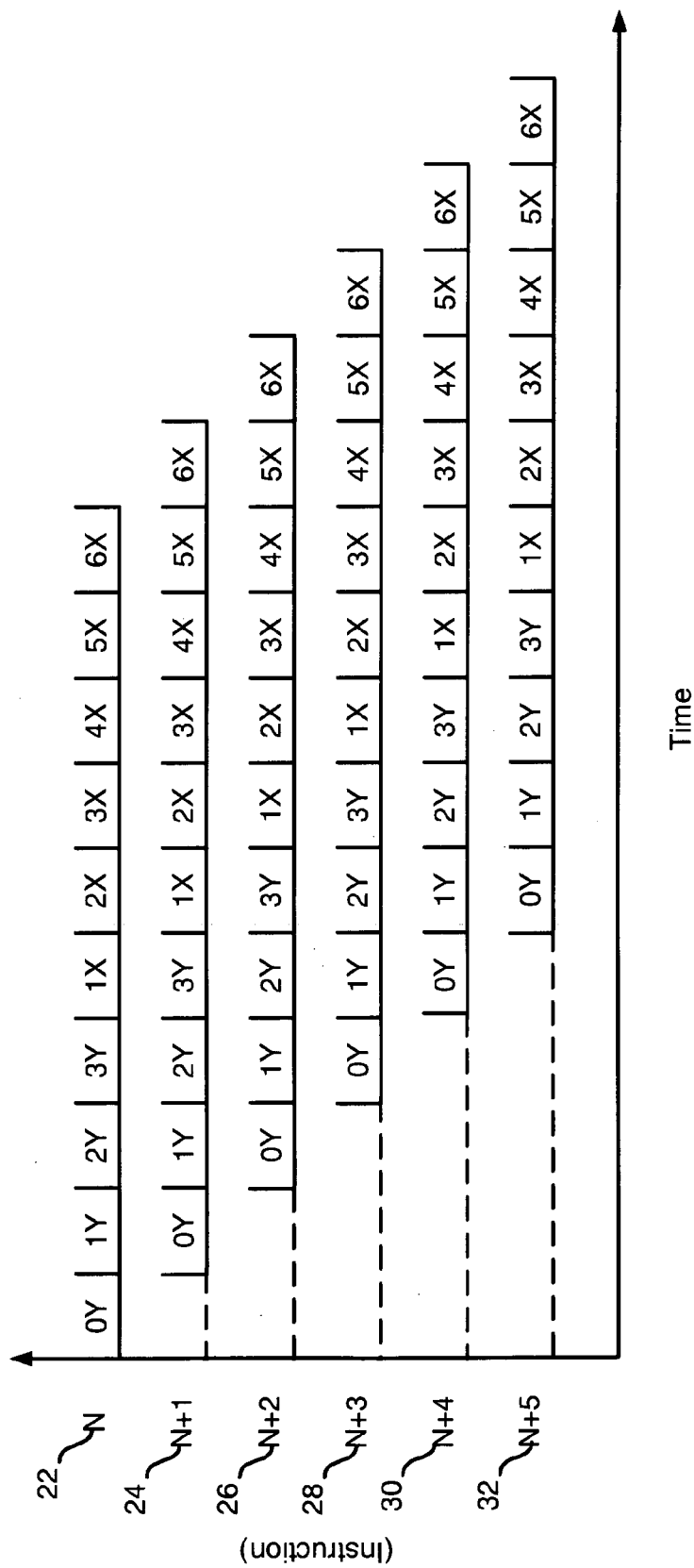
FIG. 2 is a timing diagram illustrating the pipeline instruction overlap of six consecutive standard instructions, N through N+5, in an instruction pipeline having the stages shown in FIG. 1.

FIG. 2 is a timing diagram illustrating the pipeline instruction overlap of six consecutive standard instructions, N through N+5, in an instruction pipeline having the stages shown in FIG. 1. Waveforms representing execution of these six instructions are labeled 22, 24, 26, 28, 30, and 32 respectively. The diagram represents fully overlapped execution for the four stages of instruction fetch 0Y through 3Y, and the six stages of instruction execution 1X through 6X. As stated above, during fully overlapped operation, one instruction completes every stage.

Figure 3:
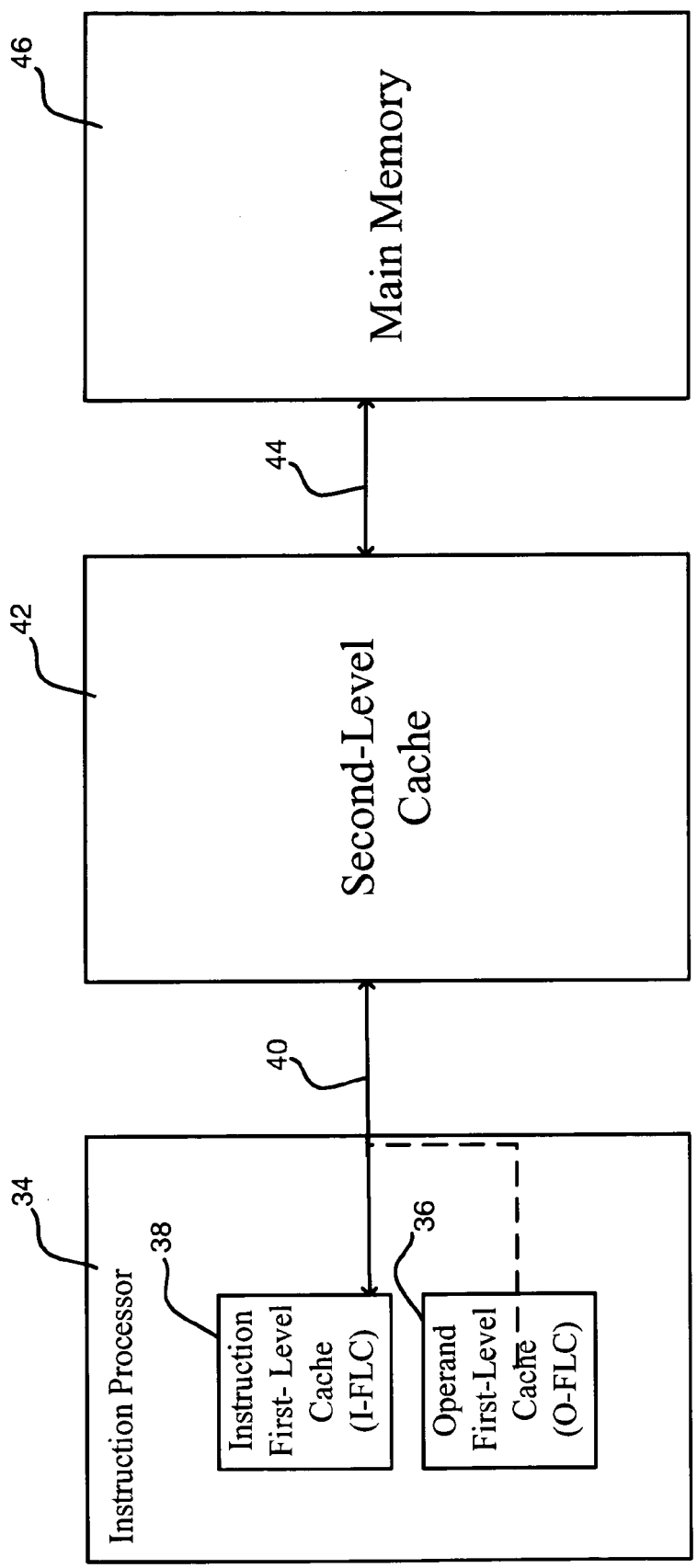
FIG. 3 shows an illustrative system environment that uses the present invention.

FIG. 3 illustrates the system environment of an illustrative embodiment of the present invention. The Instruction Processor (IP) 34 of the preferred embodiment includes both an Operand First-Level Cache (O-FLC) 36 and an Instruction First-Level Cache (I-FLC) 38. The O-FLC and I-FLC are relatively small and fast memories for storing recently-used operands and instructions, respectively, in a manner known in the art, to speed instruction execution within the IP 34.

I-FLC and O-FLC are coupled via Interface 40 to a Second-Level Cache (SLC) 42 storing both instructions and operands. Requests for instructions or operands are made to the SLC 42 when the instructions or operands are not located within the I-FLC 38 or the O-FLC 36, respectively. Similarly, the SLC 42 is coupled via Memory Interface 44 to additional storage shown as Main Memory 46. When a request is made to the SLC 42 for an item not stored in the SLC 42, the request is forwarded to Main Memory 46 for processing. In the preferred embodiment, Main memory 46 includes both a third level cache and a main storage unit. The implementation details of Main Memory 46 are beyond the scope of this application.

Figure 4:
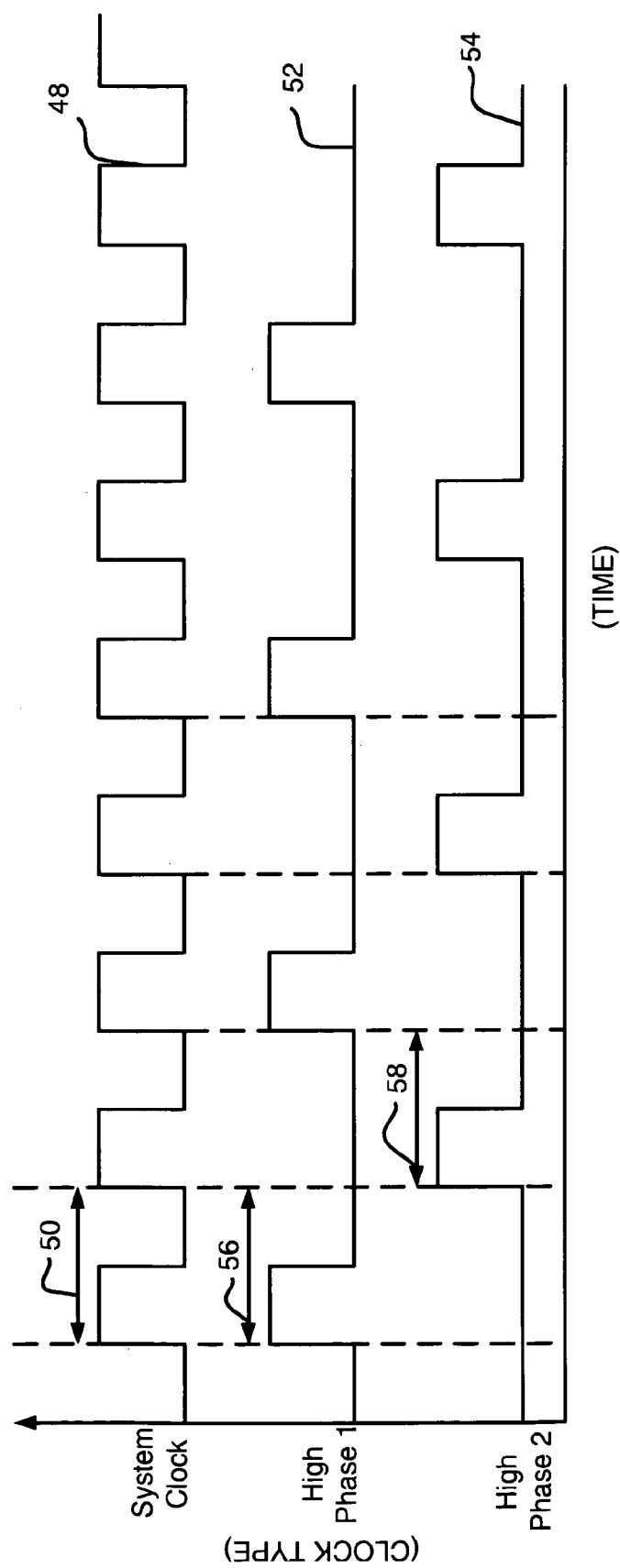
FIG. 4 is a timing diagram illustrating the clock signals associated with the IP logic of the preferred embodiment.

FIG. 4 is a timing diagram illustrating the clock signals associated with the IP logic of the preferred embodiment. The system clock shown in waveform 48 has a predetermined period 50. This system clock is used to generate all other clock signals in the system using a clock-generation scheme that is well-known in the art. Two of the clock signals used within the IP logic are represented by waveforms High Phase 1 52 and High Phase 2 54. The system clock periods associated with the high clock pulse of High Phase 1 and High Phase 2 can be referred to as Phase 1 56 and Phase 2 58 clock periods, respectively.

The Instruction Processor of the preferred embodiment has a maximum pipeline depth of six. That is, up to six instructions may be undergoing instruction execution stages simultaneously in the IP. These are referred to as the 1X through the 6X stages. Additionally, four instruction fetch stages precede the instruction execution stages. These fetch stages are referred to as stages 0Y through 3Y.

Figure 5:
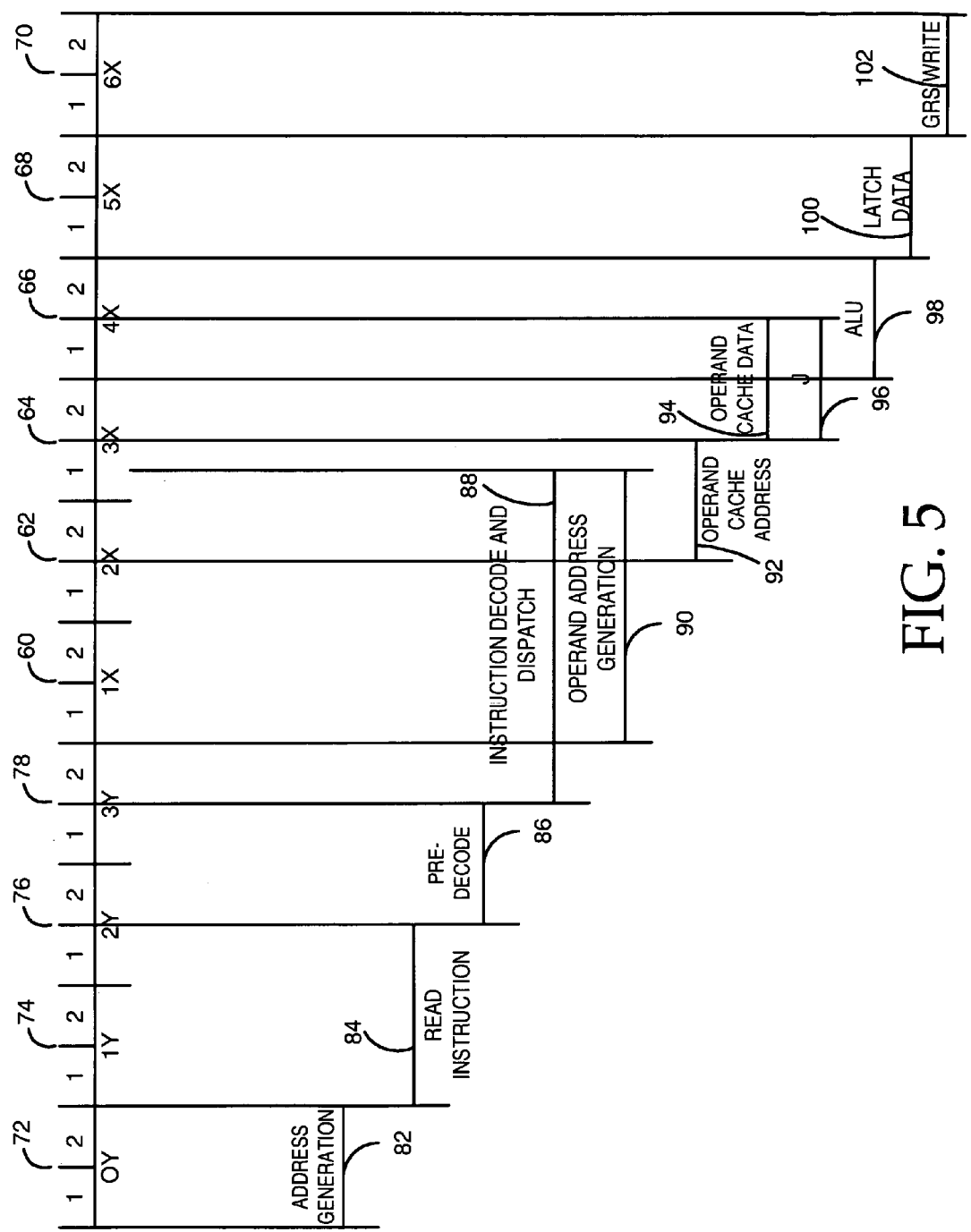
FIG. 5 is a timing sequence diagram illustrating the sequencing of a standard instruction through the instruction pipeline of the preferred embodiment.

FIG. 5 is a timing sequence diagram illustrating the sequencing of a standard instruction through the instruction pipeline of the preferred embodiment. The six execution stages 1X through 6X described above are labeled stages 60, 62, 64, 66, 68, and 70, respectively. The four additional instruction fetch stages 0Y through 3Y are label 72, 74, 76, and 78, respectively. Each of these stages is shown to have both a Phase 1 and a Phase 2. Hereinafter, a phase within one of the stages is referenced by indicating the stage followed by the phase. For example, phase 1 of stage 1X is referred to as "1X1".

As mentioned above and illustrated by Line 82, address generation for an instruction occurs in the 0Y stage. This address is used to fetch the instruction from memory. In most situations, when the addressed instruction is located in the I-FLC 38, the instruction is read from the I-FLC during the 1Y stage, as shown by Line 84. The instruction is provided to pre-decode logic that begins the instruction decode process in stage 2Y, as illustrated by Line 86. Instruction decode continues during the 3Y stage, and decoded instruction signals are provided to various logic sections of the IP during the 1X stage. This is illustrated by Line 88. Additionally, operand address generation begins during the 1X stage for any operands required by the instruction as displayed by Line 90. By 2X2, the operand cache address is available for presentation to the O-FLC 36 as shown on Line 92. At 3X2, data from the O-FLC is available as illustrated by Line 94. Line 96 represents "per J shifting", which is an operation performed to determine whether the entire operand has been fetched.

At time 4X1, the Arithmetic Logic Unit (ALU) receives any fetched operand to be processed by the instruction, and also may receive operand data retrieved from one of the registers included within an internal IP register set called the General Register Set (GRS). The ALU processes the data during the 4X stage, and the results are latched during the 5X stage. This is shown by Lines 98 and 100, respectively. Finally, data is written back to the GRS during the 6X stage, as displayed by Line 102.

The timing sequence discussed above is a general illustration of the manner in which an instruction moves through the instruction pipeline of the preferred embodiment. The above discussion assumes that a standard (non-extended) instruction is being executed, and that the instruction requires some ALU processing to occur. It will be remembered that instruction sequences vary depending on the type of instruction being executed, and the functions and timing associated with the pipeline stages will therefore also vary somewhat between instructions. The above discussion also assumes the instruction was available in the I-FLC 38. If this is not the case, the instruction is retrieved from the SCL 42. If a cache miss to the SLC 42 occurs, the instruction must be retrieved from the Main Memory 46. In either case, some processing delay may be introduced into the pipeline.

For more details on instruction decode in a pipelined data processing system see U.S. Pat. No. 5,577,259 issued on Nov. 19, 1996, entitled "Instruction Processor Control System Using Separate Hardware and Microcode Control Signals to Control the Pipelined Execution of Multiple Classes of Machine Instructions", and U.S. Pat. No. 5,872,910 issued Feb. 16, 1999, entitled "Parity-Error Injection System for an Instruction Processor", both assigned to the assignee of the present invention and both incorporated herein by reference.

As discussed above, FIG. 5 illustrates the execution of a "standard" (non-extended) instruction. This means that no additional microcode processing is necessary to complete execution of the instruction. Other instructions require that instruction execution be at least partially carried out under the control of a microsequencer with the IP. This microsequencer executes IP microcode that controls the various logic sections within the IP. When this type of execution is required, additional "extended-mode" stages must be inserted into the instruction processing time-line. This increases the time required for an instruction to complete execution, and also suspends the overlap of instruction execution within the IP pipeline.

Figure 6:
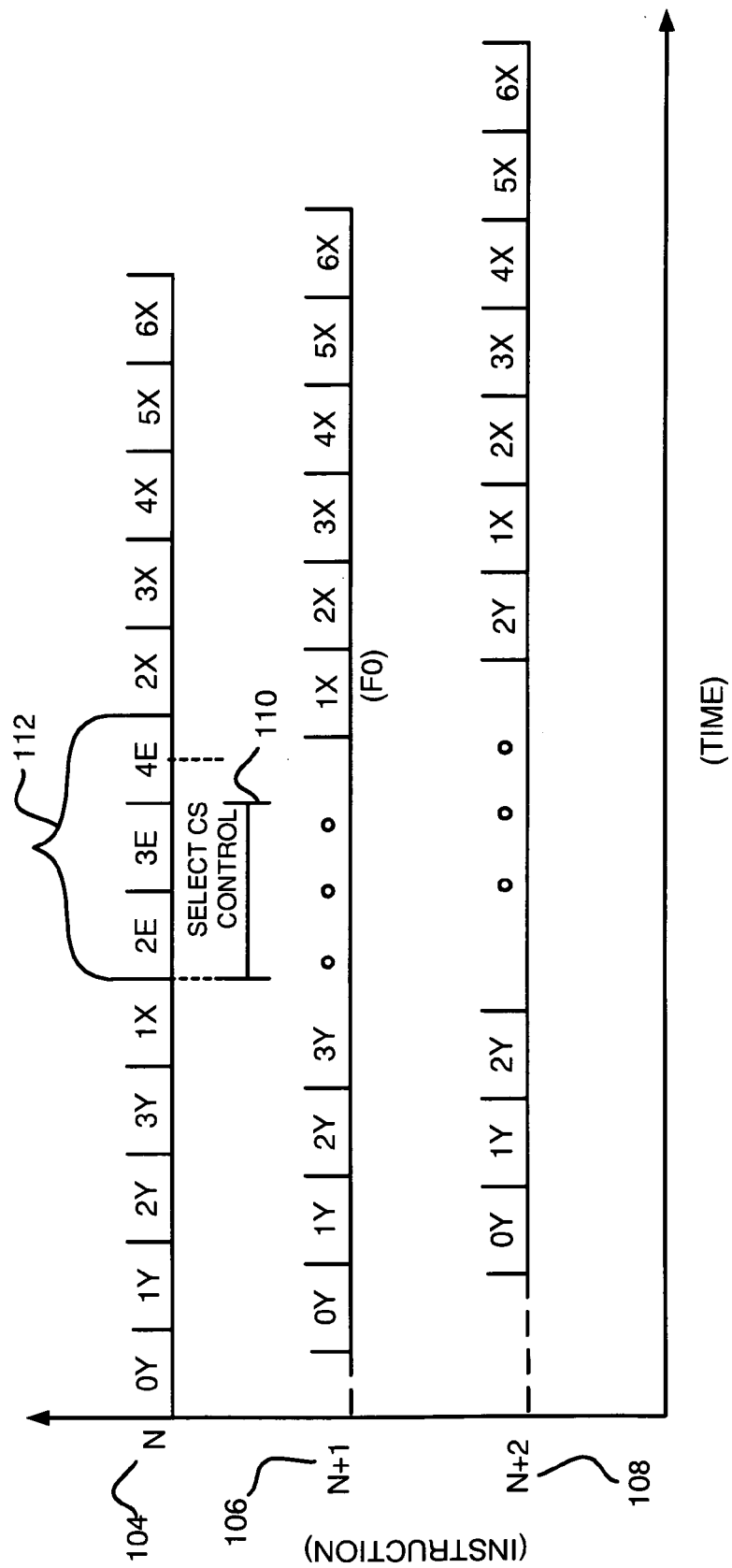
FIG. 6 is a timing diagram illustrating the suspension of instruction execution within the pipeline when an extended-cycle instruction is executed.

FIG. 6 is a timing diagram illustrating the suspension of instruction execution within the pipeline when an extended-cycle instruction is executed. Three consecutive instructions N 104, N+1 106, and N+2 108 are shown. Instruction N 104 is the extended-cycle, or "extended-mode", instruction. During execution of an extended-mode instruction, a control signal called "Select CS Control" activates during phase 2 of stage 1X, as indicated by Line 110. The activation of Select CS Control prevents the decoded instruction signals for instruction N+1 104 from being dispatched to the various IP logic sections during stage 1X of instruction N+1. This allows execution to continue under microcode control on the Nth instruction for a variable number of additional cycles 112. These additional cycles are illustratively shown as 2E, 3E, and 4E, but more extended cycles could occur. The Select CS Control signal remains active until the beginning of the last additional cycle, as shown by Line 110. After the Select CS Control signal deactivates, the next instruction N+1 106 can be loaded for decode and normal pipeline execution is resumed.

Figure 7:
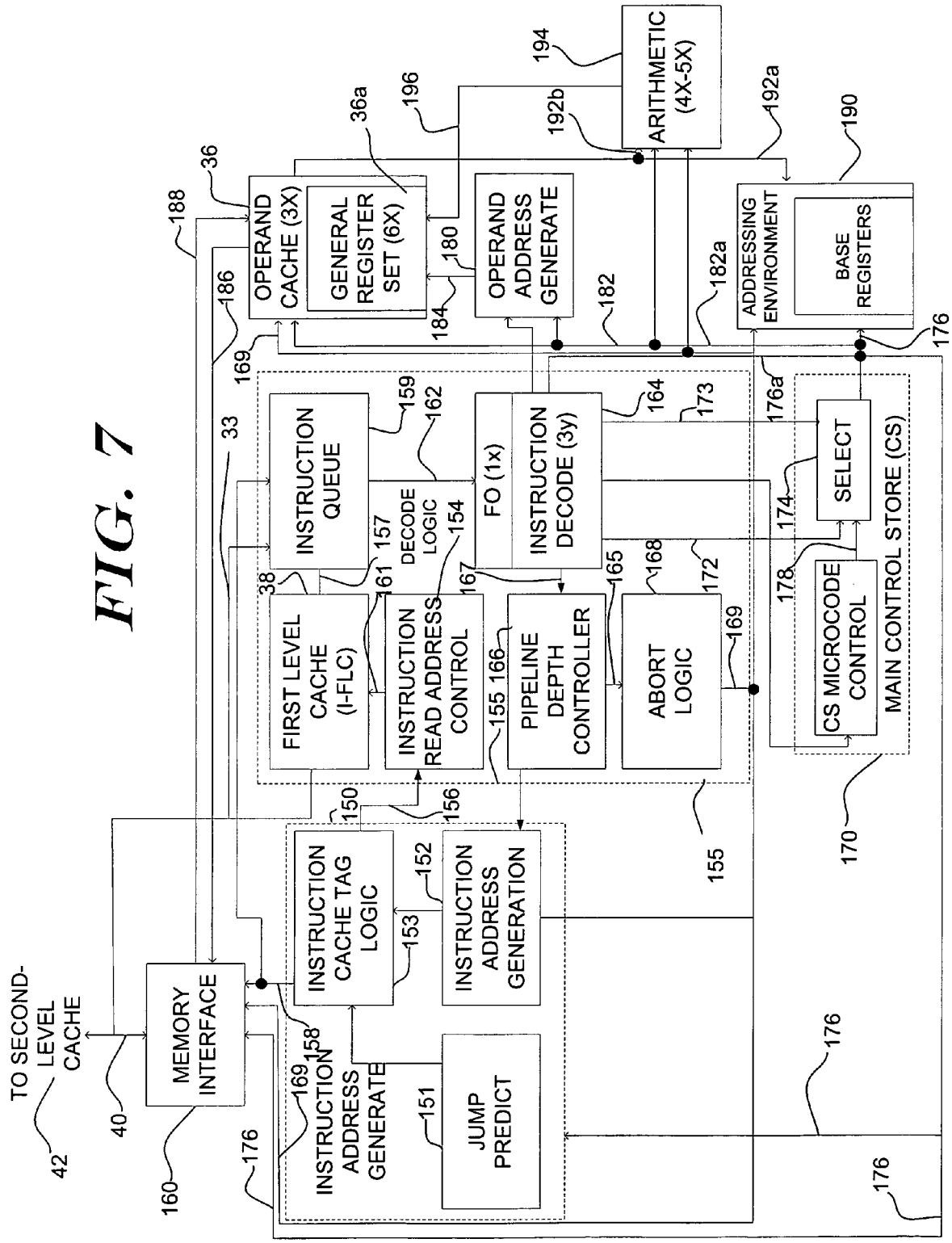
FIG. 7 is a block diagram of the major sections of an Instruction Processor of the preferred embodiment.

FIG. 7 is a block diagram of the major sections of an Instruction Processor of the preferred embodiment. Although this diagram does not provide a complete view, particularly of all data, address, and control paths, a subset of these paths is shown to facilitate an understanding of how the various IP sections interact.

During the 0Y stage, the IP of the preferred embodiment includes an Instruction Address Generate section 150 that provides logic that generates an absolute instruction address by adding a relative address to the address of a designated base register within the IP. A Jump Predict subsection 151, and an Instruction Address Generation subsection 152, provide absolute addresses to the Instruction Cache Tag Logic 153. The Instruction Cache Tag Logic 153 transfers the address to the Instruction Read Address Control logic 154, which resides in the Instruction Decode section 155, via interface 156. The Instruction Read Address Control logic 154 provides the address to the IP Instruction First-Level Cache (I-FLC) 38 on address path 161 to retrieve instructions, during the 1Y stage. The instructions are transferred to the Instruction Queue 159 over lines 157 where they are staged and begin decode during the 2Y stage.

If the Instruction Cache Tag Logic 153 indicates that a cache miss occurred, the IP suspends execution. Lines 158 communicate the miss to the IP Memory Interface 160, which initiates a memory request to the SLC 42 via Interface 40. When the instruction is returned via Interface 40, it is provided on data path 33 to Instruction Queue 159 and to the I-FLC 38 to be cached.

Instruction Queue 159 includes one or more storage devices that queue up a predetermined number of instructions. Once in the Instruction Queue 159, the instruction is staged through a series of staging registers (see FIG. 8), and begins decode. During the 3Y stage, partially decoded instruction signals are provided from the Instruction Queue 159 on lines 162 to the Instruction Decode section 164 at time 3Y2. The instruction is loaded into the instruction register F0 164a during phase 2 of stage 1X. Decode continues during the 1X stage. The instruction decode subsection 164 contains both hardware and microcode decode logic, as will be discussed in more detail below.

The Instruction Decode subsection 164 provides pipeline depth control signals to the Pipeline Depth Controller 166 over lines 167 during stage 1X. The Pipeline Depth Controller 166 uses these signals to adjust the depth of the IP pipeline. The Pipeline Depth Controller 166 interfaces with the Abort Logic section 168 and Instruction Decode subsection 164 via Pipeline Control signal 165. Together, the Pipeline Depth Controller 166 and the Abort Logic section 168 control the execution of all other logic sections over lines 169 so that the depth of the IP is pipeline is set to between one and six instructions deep.

The Instruction Decode subsection 164 further provides various control signals to the Main Control Store (CS) section 170, which is a microcode-controlled sequencer. Control signals 172 for controlling the IP pipeline are provided to two-to-one Select logic 174. Selection control for the two-to-one Select logic 174 is provided by the Select CS Control Signal 173. The Select CS Control Signal 173 selects control signals 172 during all stages of standard instruction execution. Control signals 172 are thereby provided to all logic sections via the IP pipeline control lines 176 and 176a to control standard instruction execution.

Control signals 172 are also selected and provided on the IP pipeline control lines 176 for the 1X stage during execution of extended-mode instructions. During all subsequent stages of extended-mode instruction execution, however, the microcode-controlled signals 178 are selected by the Select CS Control Signal 173 by Select logic 174, and are provided to all logic sections to control instruction execution.

The hardware control signals generated by the Instruction Decode subsection 164 include addresses for the General Register Set (ORS) 36a. These addresses are provided over lines 182 to the Operand Address Generate section 180. During the 2X stage, the Operand Address Generate section 180 generates a 24-bit operand absolute address, which is transferred to the Operand Cache (O-FLC) 36 on lines 184.

During the 3X stage, the operand absolute address is used to fetch the operand from cache memory. Specifically, after the absolute operand address has been received by the O-FLC 36, the O-FLC logic determines whether the operand is resident in the O-FLC 36. If the operand is not resident, the IP suspends instruction execution and initiates a memory read using a real address generated by the O-FLC 36. This real address is transferred over lines 186 to the Memory Interface 160, which then controls the memory request to the SLC 42 over the Interface 40. After the operand is returned on the Interface 40 to the Memory Interface 160, the operand is provided to the O-FLC 36 on lines 188.

If an O-FLC hit occurs, or after execution has resumed in the case of an operand cache miss, the operand data is available at 3X2 time. This data is provided to the Addressing Environment logic 190 over path 192a, where it is used in conjunction with the addressing signals provided on lines 182a to generate the next operand cache address. Operand data is further made available over lines 192b to the Arithmetic section 194 during the end of the 3X stage. The Arithmetic section 194 performs multiply/divide, floating point, and decimal arithmetic operations for the machine during the 4X stage, and the results are latched during the 5X stage. During the 6X stage, the results are stored back to the ORS 36a in Operand Cache 36 over fines 196.

Figure 8:
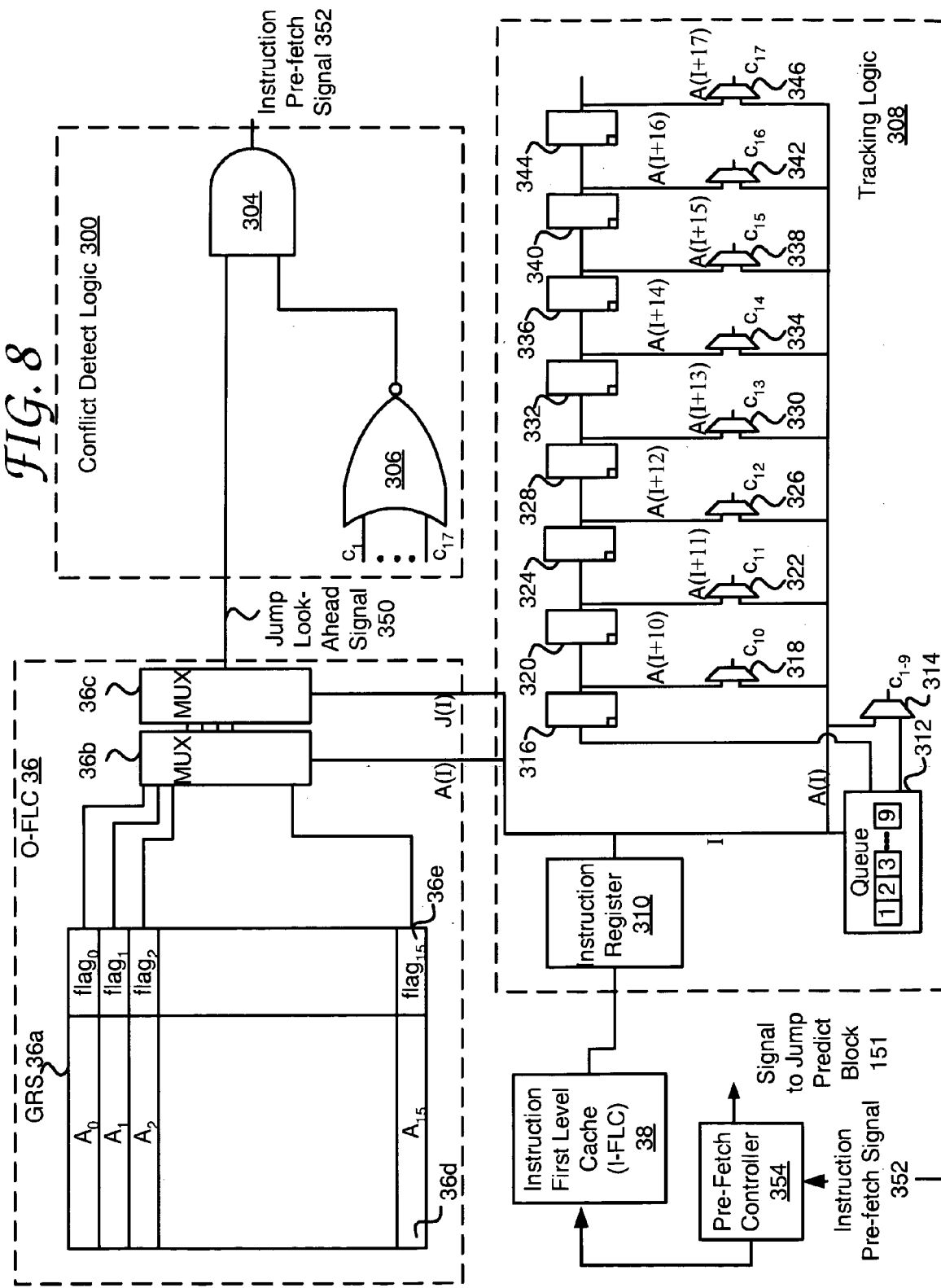
FIG. 8 is a schematic diagram showing an illustrative jump look ahead block incorporated into the instruction processor of FIG. 7.

FIG. 8 is a schematic diagram showing an illustrative jump prediction system incorporated into the Instruction Processor 34 of FIG. 7. The I-FLC 38 stores instructions I. Each instruction I includes an address A(I) and a corresponding jump field J(I). The address A(I) identifies a desired addressable register in the GRS 36a. The JUMP field J(I) identifies the type of the jump instruction of the current instruction, such as jump zero, jump negative, jump positive, and jump low bit.

The GRS 36a is used to temporarily store data during instruction execution. Each addressable register in the GRS 36a includes a Data Storage Area 36d and a corresponding Status Bit Storage Area 36e. Data Storage Area 36d stores a digital value, such as an operand, while the Status Bit Storage Area 36e stores one or more status bits or conditional flags that correspond to the digital value.

In an illustrative embodiment of the present invention, each status bit corresponds to a particular type of jump instruction, such as: jump zero, jump negative, jump positive, and jump low bit. To determine whether a jump condition will be satisfied for a current instruction I, the jump status bit at address A(I) that corresponds to the jump field J(I) is accessed. In the illustrative embodiment, the desired jump status bit is accessed in two steps. First, address A(I) of the current instruction is provided to MUX 36b, which selects the jump status bits associated with the register in the GRS 36a at address A(I). Second, the jump filed J(I) of the current instruction is provided to MUX 36c, which selects and outputs only the desired jump status bit. The desired jump status bit is output from MUX 36c as Jump-Look Ahead Signal 350.

Jump Look Ahead Signal 350 is provided to Conflict Detect Logic 300. Also provided to Conflict Detect Logic 300 is a series of control signals $c_1$–$c_{17}$. Control signals $c_1$–$c_{17}$ are generated by comparing the addresses referenced by a predetermined number of previous instructions, to determine if any of the preceding instructions in the instruction pipeline also reference the register A(I). If so, the jump prediction mechanism of the present invention is disabled by setting the Instruction Pre-fetch Signal 352 low. Also, if the Jump Look Ahead Signal 350 is low, the Instruction Pre-fetch Signal 352 is low. If, however, the Jump Look Ahead Signal 350 is high and none of the preceding instructions in the instruction pipeline reference register A(I), the Instruction Pre-Fetch Signal 352 is high.

The Instruction Pre-fetch Signal 352 is provided to Pre-Fetch Controller 354. When the Instruction Pre-fetch Signal 352 is low, the Pre-Fetch Controller 354 disables the jump prediction logic of the present invention, but enables the normal Jump Prediction Block 151 of FIG. 7. When the instruction Pre-fetch Signal 352 is high, the Pre-Fetch Controller 354 disables the normal Jump Prediction Block 151 of FIG. 7, and provides the target address specified by the current jump instruction to the FLC 38. The FLC 38 retrieves the target instruction, and provides the instruction to the instruction register 310 for execution.

The following discussion describes in more detail the generation of control signals $c_1$–$c_{17}$ and the operation of Conflict Detect Logic 300. Instructions from the I-FLC 38 are sequentially presented to an Instruction Register 310, which is located in the Instruction Queue 159 of FIG. 7. The Instruction Queue 150 may also include a Queue 312, Comparators 314 and 318, and Staging Registers 316 and 320. The Queue 312 stores a predetermined number of instructions that are sequentially provided to the Queue 312 via the Instruction Register 310, prior to being sequentially processed by the Instruction Processor 34 of FIG. 7 via Staging Registers 316, 320, 324, 328, 332, 336, 340 and 344.

In the preferred embodiment, the predetermined number of instructions that are stored in the queue 312 is nine (9).

Instructions are sequentially output from the Queue 312 and sequentially provided to Staging Registers 316, 320, 324, 328, 332, 336, 340 and 344. For instance, if current instruction I is output from the Instruction Register 310, previous instructions I+1, I+2, I+3, I+4, I+5, I+6, I+7, I+8, I+9 are stored in the Queue 312. Instructions I+10, I+11, I+12, I+13, I+14, I+15, I+16, I+17 are staged at Staging Registers 316, 320, 324, 328, 332, 336, 340 and 344, respectively.

To determine if a previous instruction could alter data in the desired register A(I) of the current instruction I, addresses A(I+1), A(I+2), A(I+3), A(I+4), A(I+5), A(I+6), A(I+7), A(I+8) and A(I+9) from the instructions stored in the Queue 312 are routed to the Comparator 314 and compared to the address A(I) of current instruction, as shown. The Comparator 314 outputs a predetermined number of control signals $c_1, c_2, c_3, c_4, c_5, c_6, c_7, c_8$, and cg. Control signals $c_{1-9}$ will all be zero unless one of the addresses A(I+1), A(I+2), A(I+3), A(I+4), A(I+5), A(I+6), A(I+7), A(I+8) and A(I+9) matches the address A(I) of the current instruction.

Similarly, addresses A(I+10), A(I+11), A(I+12), A(I+13), A(I+14), A(I+15), A(I+16), and A(I+17) for the instructions staged in Staging Registers 316, 320, 324, 328, 332, 336, 340 and 344 are routed to Comparators 318, 322, 326, 330, 334, 338, 342, and 346, respectively, and compared to the address A(I) of cur-rent instruction, as shown. Comparators 318, 322, 326, 330, 334, 338, 342, and 346 provide control signal $c_{10}, C_{11}, C_{12}, C_{13}, C_{14}, C_{15}, C_{16}$, and $c_{17}$. Control signals $c_{10-17}$ will all be zero unless one of the addresses A(I+10), A(I+11), A(I+12), A(I+13), A(I+14), A(I+15), A(I+16), and A(I+17) match the address A(I) of the current instruction.

The illustrative Conflict Detection Logic section 300 contains a NOR gate 306 and an AND gate 304. Control signals $c_1$–$c_{17}$ are provided to NOR gate 306. The output of the NOR gate 306, along with the Jump Look-ahead Signal 350, are provided to AND gate 304. AND gate 304 provides Instruction Pre-fetch Signal 352. As indicated above, the Instruction Pre-fetch Signal 352 is provided to Instruction Pre-fetch Controller 354. Instruction Pre-fetch Controller 354 outputs a signal to the I-FLC 38 to locate the next instruction if the jump will be taken. Otherwise, the Instruction Pre-fetch Controller 354 outputs a signal to the Jump Predict section 151 of FIG. 7, if traditional methods of jump prediction are to be implemented. If any of the control signals $c_1$–$c_7$ are high (i.e. the current instruction address A(I) is the same as any one of the previous instruction addresses A(I+1)–A(I+17)) the Instruction Pre-fetch Signal 352 is low and traditional methods of jump prediction may be implemented.

The following discussion is in reference to FIGS. 7 and 8. As stated previously, the Tracking Logic section 308 includes various logic blocks distributed throughout the Instruction Processor 34 (illustrated in FIG. 7). The Instruction queue 159 may include the Instruction Register 310, the Queue 312, Comparators 314, 318 and 322, and Staging Registers 316 and 320.

Instruction I+10 passes through Staging Register 316 during the 2Y stage, while instruction I+11 passes through Staging Register 320 during the 3Y stage. The Staging Register 324 and the Comparator 330 may be included in the Instruction decode section 164. Instruction I+12 passes through Staging Register 324 during the 1X stage. The Staging Register 328 and the Comparator 330 may be included in the Operand Address Generate section 180.

Instruction I+13 passes through Staging Register 328 during the 2X stage. The Staging Register 332 and the Comparator 334 may be included in the O-FLC 36. Instruction I+14 passes through Staging Register 332 during the 3X stage. The Staging Register 336 and the Comparator 338 may be included in the Arithmetic section 194. Instruction I+15 passes through Staging Register 336 during the 4X stage. The Staging Register 340 and the Comparator 342 may be included in the Arithmetic section 194. Instruction I+16 passes through Staging Register 340 during the 5X stage. The Staging Register 344 and the Comparator 346 may be included in the Arithmetic section 194 or the O-FLC 36. Instruction I+17 passes through Staging Register 344 during the 6X stage.

Figure 9:
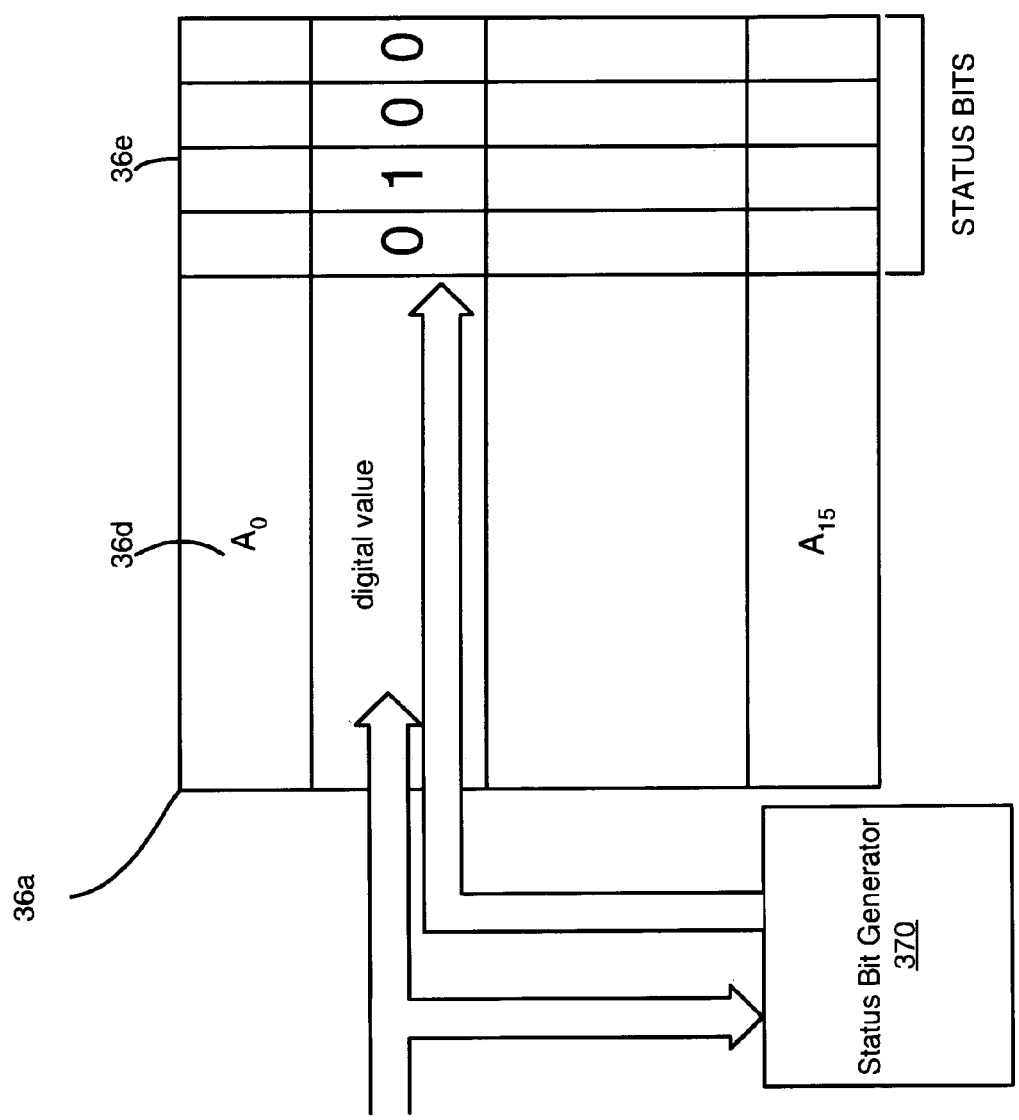
FIG. 9 is a block diagram showing the generation and storage of status bits in the General Register Set (GRS) of FIG. 7.

FIG. 9 represents the generation and storage of the status bits of FIG. 8. Prior to writing data to the ORS 36a, which contains a predetermined number of addressable registers as described above, the digital values to be stored in the ORS 36a are input to a Status Bit Generator 370. The Status Bit Generator 370 contains logic that calculates the status bits for each digital value to be stored in the Data Storage Area 36d. The status bits form the condition flag. Each digital value has a corresponding condition flag including a predetermined number of status bits. In the preferred embodiment, the number of status bits is four. The status bits correspond to, but are not limited to, jump zero, jump negative, jump low-bit, and jump positive instructions.

After the condition flag has been generated by the Status Bit Generator 370, the digital values and condition flags are stored in the appropriate register in the ORS 36a. In the prefer-red embodiment, GRS 36a contains 16 addressable registers. Each addressable register includes a Data Storage Area 36d and a Condition Flag Storage Area 36e.

Having thus described the preferred embodiments of the present invention, those of skill in the art will readily appreciate that the teachings found herein may be applied to yet other embodiments within the scope of the claims hereto attached.

What is claimed is:

1. A method for processing a conditional jump instruction in a pipelined instruction processor, the method comprising:

generating at least one status bit based on a digital value to be stored, the at least one status bit relating to a particular condition of a conditional jump instruction and specifying if the particular condition of the conditional jump instruction is satisfied or not;

storing the digital value and the at least one status bit to a commonly addressed memory location; and in response to a conditional jump instruction, reading from the commonly addressed memory location the digital value and the at least one status bit to resolve whether the condition of the conditional jump instruction is satisfied before the conditional jump instruction reaches an arithmetic logic stage of the pipelines instruction processor.

2. The method recited in claim 1, wherein the at least one status bit is read from memory at the same time as the digital value.

3. The method recited in claim 1, wherein the memory has one or more addressable locations, and the at least one status bit is stored at the same addressable location as the corresponding digital value.

4. The method recited in claim 1, wherein the at least one status bit is set high if the digital value is zero.

5. The method recited in claim 1, wherein the at least one status bit is set high if the digital value is a positive value.

6. The method recited in claim 1, wherein the at least one status bit is set high if the digital value is negative.

7. The method recited in claim 1, wherein the at least one status bit is set high if the digital value is a non zero value.

8. The method recited in claim 1, wherein the at least one status bit is set high based on the value of the least significant bit of the digital value.

9. In a pipelined instruction processor that executes instructions including conditional jump instructions, one or more of the conditional jump instructions reading a digital value from memory to determine if the condition of the conditional jump instruction is satisfied, the improvement comprising:

a status bit generator for generating at least one status bit based on a digital value, the at least one status bit relating to a particular condition of a conditional jump instruction and specifying if the particular condition of the conditional jump instruction is satisfied or not;

storing means for storing the digital value and the at least one status bit to a commonly addressed memory location of the memory; and conditional jump processing means, activated in response to the execution of a conditional jump instruction, the conditional jump processing means reading from the commonly addressed memory location of the memory the digital value and the at least one status bit to resolve whether the condition of the conditional jump instruction is satisfied before the conditional jump instruction reaches an arithmetic logic stage of the pipelines instruction processor.

10. The pipelined instruction processor recited in claim 9, wherein the at least one status bit is read from the memory at the same time as the digital value is read.

11. The pipelined instruction processor recited in claim 9, wherein the memory has one or more addressable locations, and the at least one status bit is stored at the same addressable location as the corresponding digital value.

12. The pipelined instruction processor recited in claim 9, wherein the at least one status bit is set high if the digital value is zero.

13. The system recited in claim 9, wherein the at least one status bit is set high if the digital value is a positive value.

14. The system recited in claim 9, wherein the at least one status bit is set high if the digital value is negative.

15. The system recited in claim 9, wherein the at least one status bit is set high if the digital value is a non zero value.

16. The system recited in claim 9, wherein the at least one status bit is set high based on the value of the least significant bit of the digital value.

17. In a pipelined instruction processor that executes instructions including conditional jump instructions, one or more of the conditional jump instructions reading a digital value from memory to determine if the condition of the conditional jump instruction is satisfied, the improvement comprising:

a plurality of addressable registers, each of the addressable registers storing a value that includes a digital value and at least one jump status bit;

logic to access a current instruction, wherein the current instruction includes an address and a corresponding jump field, the address identifies one of the addressable registers and the corresponding jump field identifies a jump status bit of the at least one jump status bits within the identified addressable register;

a jump look-ahead controller for generating a jump look-ahead signal using the address that identifies one of the addressable registers and the jump field that identifies a jump status bit within the identified addressable register, the jump look-ahead signal is a function of the identified jump status bit;

tracking logic for tracking the addresses of a predetermined number of previous instructions in the pipelined instruction processor and comparing the addresses of each previous instruction to the address of the current instruction to generate a series of jump disable signals; and conflict detection logic for generating a jump early signal using the jump look-ahead signal and the series of jump disable signals, the jump early signal initiates the conditional jump depending on the values of the jump disable signals.

18. The pipelined instruction processor as recited in claim 17, wherein each jump status bit is dependent on the digital value stored in the corresponding addressable register.

19. The pipelined instruction processor as recited in claim 17, further comprising a bit status generator for generating the corresponding jump status bits.

20. The pipelined instruction processor as recited in claim 17, further comprising a prediction logic block responsive to the jump early signal for implementing a prediction algorithm to predict the conditional jump depending on the values of the jump disable signals.

21. The pipelined instruction processor as recited in claim 17, wherein the tracking logic includes a queue for sequentially storing a pre-determined number of instructions prior to sequentially piping the pre-determined number of instructions through a read stage and decode stage in a pre-fetch pipeline.

22. The pipelined instruction processor as recited in claim 21, wherein the pre-determined number of instructions are sequentially piped through an execution pipeline after being piped through a pre-fetch pipeline, the execution pipeline includes a write-back stage.

23. The pipelined instruction processor as recited in claim 22, wherein the addressable register is written during the write-back stage.

24. The pipelined instruction processor as recited in claim 23, wherein the execution pipeline further includes an address generation stage, a present address stage, an output operand stage, a capture data stage, and an arithmetic operation stage, all before the write-back stage.

25. A method for determine if a condition of a conditional jump instruction is satisfied in a pipelined instruction processor, the method comprising:

storing a digital value and one or more jump status bits that are based on the digital value in one or more of a plurality of address locations in an addressable memory;

accessing a current instruction, the current instruction having an address and a jump field, the address identifies a selected address location of the addressable memory, and the jump field identifies a selected jump status bit of the selected address location;

generating a jump look-ahead signal that is a function of the selected jump status bit read from the selected address location of the addressable memory, the identified jump status bit is accessed using the address and the jump field of the current instruction;

tracking the addresses of a predetermined number of previous instructions in the pipelined instruction processor and comparing the addresses to the address of the current instruction to generate a series of jump disable signals; and generating a jump early signal using the jump-look ahead signal and the series jump disable signals, the jump early signal initiates a conditional jump depending on the value of the jump disable signals.

* * * * *